United States Patent
Van Herpen et al.

(10) Patent No.: US 10,785,097 B2
(45) Date of Patent: Sep. 22, 2020

(54) CONFIGURING INTERACTION CONTROL IN MULTI-CONTROLLER NETWORK

(71) Applicant: PHILIPS LIGHTING HOLDING B.V., Eindhoven (NL)

(72) Inventors: Maarten Marinus Johannes Wilhelmus Van Herpen, Eindhoven (NL); Ivo Wilhelmus Johannes Marie Rutten, Eindhoven (NL); Huon Urbald Ogier Norbert Van De Laarschot, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 853 days.

(21) Appl. No.: 14/764,097

(22) PCT Filed: Jan. 27, 2014

(86) PCT No.: PCT/IB2014/058562
§ 371 (c)(1),
(2) Date: Jul. 28, 2015

(87) PCT Pub. No.: WO2014/122552
PCT Pub. Date: Aug. 14, 2014

(65) Prior Publication Data
US 2016/0013975 A1 Jan. 14, 2016

Related U.S. Application Data

(60) Provisional application No. 61/761,901, filed on Feb. 7, 2013.

(51) Int. Cl.
*G06F 15/177* (2006.01)
*H04L 12/24* (2006.01)
(Continued)

(52) U.S. Cl.
CPC ...... *H04L 41/0806* (2013.01); *H04L 12/2814* (2013.01); *H04L 67/22* (2013.01); *H04L 67/303* (2013.01); *H04L 67/306* (2013.01)

(58) Field of Classification Search
None
See application file for complete search history.

(56) References Cited

U.S. PATENT DOCUMENTS 5,544,321 A 8/1996 Theimer
7,200,683 B1 * 4/2007 Wang .................. H04L 12/2803
709/250
(Continued)

FOREIGN PATENT DOCUMENTS

CN 101887342 A 11/2010
CN 202306275 U 7/2012
(Continued)

OTHER PUBLICATIONS

Namatame, Naoya et al "A Distributed Resource Management Architecture for Interconnecting Web-of-Things using uBox", ACM, Jun. 2011.

*Primary Examiner* — Razu A Miah
(74) *Attorney, Agent, or Firm* — Daniel J. Piotrowski (57) ABSTRACT

The present invention relates to an improved method of controlling interaction between network-enabled devices. In a network comprising multiple control devices, the selection of a control device can enable the mitigation of privacy risks and security risks and can further avoid frequent communications between network-enabled devices and an internet-based service (which increase power usage) as well as prevent devices becoming uncontrollable (based on failure of the network-enabled devices to connect to an internet-based service for control). The method comprises the steps of a user selecting an interaction schedule (102) and selec- (Continued)

tion of a control device (104) as well as configuration of devices (106), based on said interaction scenario and said control scenario.

11 Claims, 9 Drawing Sheets

(51) Int. Cl.
*H04L 29/08* (2006.01)
*H04L 12/28* (2006.01)

(56) References Cited

U.S. PATENT DOCUMENTS

| | | | | |
|---|---|---|---|---|
| 7,730,223 B1 * | 6/2010 | Bavor | ............... | G06F 3/0481 709/223 |
| 7,917,661 B2 * | 3/2011 | Bavor | ............... | G06F 3/0481 710/8 |
| 8,555,371 B1 * | 10/2013 | Signaoff | ............ | H04L 41/0806 370/356 |
| 9,692,641 B2 * | 6/2017 | Sakai | ............... | H04L 41/0806 |
| 2002/0178398 A1 | 11/2002 | Sekiguchi | | |
| 2003/0065472 A1 * | 4/2003 | Eckel | ................. | H05B 37/02 702/130 |
| 2005/0128048 A1 * | 6/2005 | Krzyzanowski | ..... | G05B 19/042 340/3.71 |
| 2005/0254429 A1 * | 11/2005 | Kato | ................. | H04L 41/0806 370/238 |
| 2006/0031459 A1 * | 2/2006 | Ahn | .................. | H04L 41/0873 709/224 |
| 2006/0259604 A1 * | 11/2006 | Kotchavi | ........... | H04L 41/0226 709/223 |
| 2007/0032225 A1 * | 2/2007 | Konicek | ........... | H04M 1/72513 455/417 |
| 2007/0198663 A1 * | 8/2007 | Helander | ........... | H04L 41/0806 709/220 |
| 2008/0058437 A1 | 3/2008 | Burgun et al. | | |
| 2008/0244421 A1 * | 10/2008 | Chen | ................. | H04L 12/2809 715/762 |
| 2008/0313316 A1 * | 12/2008 | Hite | ................... | H04L 12/2803 709/223 |
| 2009/0262665 A1 * | 10/2009 | Kim | ..................... | H04L 12/282 370/254 |
| 2010/0094981 A1 * | 4/2010 | Cordray | ............... | H04L 41/082 709/222 |
| 2010/0138007 A1 * | 6/2010 | Clark | ................. | H04L 12/2809 700/90 |
| 2010/0217837 A1 * | 8/2010 | Ansari | ................. | G06Q 30/04 709/218 |
| 2010/0235433 A1 * | 9/2010 | Ansari | ................. | G05B 15/02 709/203 |
| 2011/0046792 A1 * | 2/2011 | Imes | .................... | H04L 63/105 700/278 |
| 2011/0185069 A1 * | 7/2011 | Zetterlund | .......... | H04L 65/1069 709/227 |
| 2011/0202198 A1 | 8/2011 | Venkatakrishnan et al. | | |
| 2012/0066632 A1 * | 3/2012 | Sundermeyer | ....... | G08B 25/003 715/771 |
| 2012/0079091 A1 * | 3/2012 | Ermis | .................. | H04L 41/024 709/223 |
| 2012/0079092 A1 * | 3/2012 | Woxblom | ............... | H04L 47/20 709/223 |
| 2012/0106542 A1 * | 5/2012 | Inoue | .................. | H04L 65/1059 370/352 |
| 2012/0117249 A1 * | 5/2012 | Jung | .................... | H04L 12/2809 709/227 |
| 2012/0185942 A1 * | 7/2012 | Dixon | ..................... | G06Q 10/06 726/24 |
| 2012/0259990 A1 * | 10/2012 | Akisada | ............... | H04L 41/0806 709/228 |
| 2012/0324065 A1 * | 12/2012 | Yang | ......................... | G06F 8/65 709/221 |
| 2013/0031037 A1 * | 1/2013 | Brandt | ................ | H04L 63/1408 706/12 |
| 2013/0113993 A1 * | 5/2013 | Dagit, III | ................ | G06F 3/017 348/552 |
| 2013/0232338 A1 * | 9/2013 | Byres | ..................... | H04L 67/34 713/162 |
| 2013/0268664 A1 * | 10/2013 | Lidstrom | ................. | H04L 67/22 709/224 |
| 2014/0010111 A1 * | 1/2014 | Kodama | ............ | G05B 19/4185 370/254 |
| 2014/0068046 A1 * | 3/2014 | Sakai | .................. | H04L 41/0806 709/223 |
| 2014/0095605 A1 * | 4/2014 | Varvello | .................. | H04L 67/22 709/204 |
| 2014/0143695 A1 * | 5/2014 | Sundermeyer | .......... | H04L 41/22 715/765 |
| 2015/0146567 A1 * | 5/2015 | Ylimartimo | ........ | H04L 63/0272 370/254 |
| 2016/0043896 A1 * | 2/2016 | Fiedler | ................ | H04L 12/2803 370/254 |

FOREIGN PATENT DOCUMENTS

| | | |
|---|---|---|
| JP | 2002506551 A | 2/2002 |
| JP | 2004192077 A | 7/2004 |
| JP | 2004310377 A | 11/2004 |
| JP | 2006094119 A | 4/2006 |
| JP | 2006196956 A | 7/2006 |
| JP | 2006350819 A | 12/2006 |
| JP | 2008033618 A | 2/2008 |
| JP | 2011055121 A | 3/2011 |

\* cited by examiner

CONFIGURING INTERACTION CONTROL IN MULTI-CONTROLLER NETWORK

CROSS-REFERENCE TO PRIOR APPLICATIONS

This application is the U.S. National Phase application under 35 U.S.C. § 371 of International Application No. PCT/IB2014/058562, filed on Jan. 27, 2014, which claims the benefit of U.S. Provisional Patent Application No. 61/761,901, filed on Feb. 7, 2013. These applications are hereby incorporated by reference herein.

FIELD OF THE INVENTION

The present invention relates generally to controlling networked devices and specifically to configuring interaction between networked devices in a multi-controller network.

BACKGROUND OF THE INVENTION

Increasingly, devices in, for example, the home and office environment are becoming network-enabled. As such, network-enabled devices can be controlled over a network, for example through an internet-based service. An example of controlling networked devices through a server is known from U.S. patent application Ser. No. 10/500,683. An internet-based service can simplify the task of controlling network-enabled devices. However, controlling network-enabled devices through an internet-based service poses privacy risks (e.g. logging of user activity) and security risks (e.g. hostile takeover of control). Additionally, frequent communications between network-enabled devices and an internet-based service can increase power usage. Furthermore, failure of the network-enabled devices to connect to the internet-based service can render the network-enabled devices uncontrollable. There is a need for an improved method of controlling network-enabled devices.

SUMMARY OF THE INVENTION

It is an object of the present invention to provide an improved method of controlling network-enabled devices. Said object of the invention is achieved by the introduction of a method of controlling network-enabled devices comprising the steps of presenting, through a web service accessible via a first network, a set of interaction schedules to a user, based on device profiles related to a user profile of the user; receiving from the user through the web service a selection of an interaction schedule of the set of interaction schedules, said selection relating to a first device and a second device accessible through a second network, operationally coupled to the first network; selecting a control device based on the selected interaction schedule and based on said device profiles related to said user profile of the user; and configuring the selected control device, the first device and the second device based on the selected interaction schedule. This is beneficial as it allows the selection of a control device that provides any of: improved privacy protection, improved security, lower power usage, less dependency on availability of internet-based services, and other benefits. Further, this selection can be implemented in a user-friendly way, for example, through utilizing the relationship between the user profile and devices (such as control devices) and device profiles.

In an embodiment of the method according to the invention, the control device is the first device. This is advantageous, as a single device can operate both as control device and first device, which can implement the interaction at a local level, save space and provide additional benefits.

Another embodiment of the method according to the invention further comprises the steps of presenting through the web service a set of control scenarios to the user; and receiving from the user, through the web service, a selection of a control scenario from the set of control scenarios; wherein the step of selecting a control device is further based on the selected control scenario. An advantage of this embodiment is that it increases the level of user control.

In yet another embodiment of the method according to the invention, the set of control scenarios comprises at least one of: a privacy-based control scenario, a security-based control scenario, a functionality-based control scenario, an availability-based control scenario, a response speed-based control scenario or a location-based control scenario. This embodiment can provide benefits to the user in simplifying the control scenario selection process and providing control scenarios that can fulfill user needs.

In a further embodiment of the method according to the invention, the step of configuring the selected control device, the first device and the second device comprises at least one of: configuring the first device to send an event to the selected control device; configuring the selected control device to poll the first device; or configuring the selected control device to send a control command to the second device. This embodiment advantageously provides a simplified and/or improved method of (partially) implementing the selected interaction schedule.

In another advantageous embodiment of the method according to the invention, the step of configuring the selected control device, the first device and the second device comprises, for at least one of said devices, changing control code stored in a memory unit of said device, from a first version to a second version, the second version being based on the selected interaction schedule. This embodiment provides multiple benefits, for example, it enables devices with limited processing, memory or other (general) capabilities to be included in the interaction schedule. Another benefit related to this embodiment is that interaction schedules can be preserved when devices are reset and/or after devices have been temporarily powered down. Yet another benefit is related to devices that were not designed for interaction or for specific interaction features or general features, but that gain such features as part of this configuration step.

In yet another embodiment of the method according to the invention, the step of configuring the selected control device, the first device and the second device comprises at least one of said devices receiving: the selected interaction schedule or data based on the selected interaction schedule, and a device profile or a partial device profile of the control device and/or of the first and/or the second device. This embodiment advantageously provides a simple configuration step which, for example, can be executed iteratively from one device to the next.

It is another object of the present invention to provide an improved computer program product for controlling network-enabled devices. Said object of the invention is achieved by the introduction of a computer program product for controlling network-enabled devices comprising software code portions for performing any of the steps or embodiments of the method specified above when said product is run on a computer. Such a computer program product advantageously provides any or all of the benefits and advantages related to the method and furthermore provides for the method to be implemented through one or more (computer) devices.

It is another object of the present invention to provide an improved control device for controlling network-enabled devices. Said object of the invention is achieved by the introduction of a control device for controlling network-enabled devices arranged for: receiving through a first network, an interaction schedule or data based on an interaction schedule selected by a user from a set of interaction schedules and relating to a first device and a second device, said devices relating to a user profile of the user and said devices being accessible through a second network; receiving a device profile or a partial device profile of the first device and/or the second device; controlling the first device and/or the second device based on the selected interaction schedule. The control device beneficially provides any of: improved privacy protection, improved security, lower power usage, less dependency on availability of internet-based services and other benefits. Further, this control device advantageously allows for a simplified configuration, for example, through supporting configuration using data related to the user profile and data related to the device profiles (such as data related to the device profile of the control device).

In an embodiment of the control device according to the invention, the control device is further arranged to act as a proxy for the first device and/or second device towards the web service. This is beneficial as a proxy can function, for example, as a bridge to span devices or networks that support different protocols. A further advantage is that a proxy can handle functions on behalf of the first device and/or second device and hence, for example, realize energy savings.

In a further embodiment of the control device according to the invention, the control device is further arranged as a gateway to the second network. Advantageously this can further increase privacy and security, provide greater independence from devices or services outside the second network and provide enhanced energy efficiency.

In yet another embodiment of the control device according to the invention, the control device is further arranged for receiving a control scenario or data related to a control scenario selected by the user from a set of control scenarios; and wherein controlling the first device and the second device is further based on the selected control scenario. Benefits of this embodiment include a greater level of control over how the first device and the second device are controlled as well as support for additional features of the gateway related to the selected control scenario.

In an especially advantageous embodiment of the control device according to the invention, the control device is further arranged as a gateway to the second network, and the control device is further arranged to monitor data communications passing the gateway, and to intercept, block and/or amend such data communications to or from the first device and/or the second device, based on the control scenario. This embodiment can further improve privacy protection, security and power efficiency. It can further lower the dependency on availability of internet-based services and additionally provide other benefits.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The numbers of the figures quoted below refer to the attached drawings.

BRIEF DESCRIPTION OF THE FIGURES

The above and other aspects and features of the present invention will become more apparent from the following detailed description considered in connection with the accompanying drawings, in which.

DETAILED DESCRIPTION OF THE FIGURES

Figure 1:
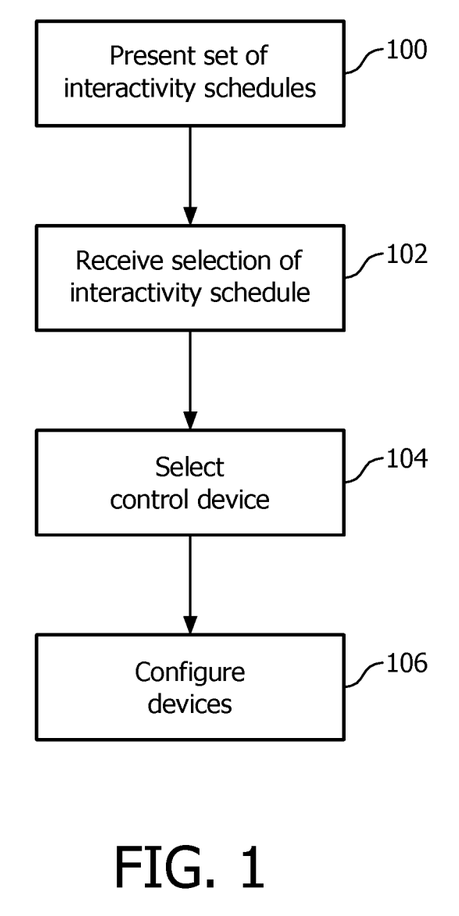
FIG. 1 shows schematically and exemplarily an embodiment of the method according to the invention.

In FIG. 1 an embodiment of the method according to the invention is shown. In a first step 100 a set of interactivity schedules is presented to a user. A web service, accessible through a first network, can present the set of interactivity schedules through, for example, a website or an application which the user can access through a personal computer, a mobile device (e.g. a cell phone, smart phone, tablet computer, laptop), etc. As part of the presentation, an interactivity schedule can be recommended or highlighted, interactivity schedules can be ranked or otherwise presented in a manner that simplifies the task of selecting an interactivity schedule from the set of interactivity schedules. Based on, for example, user preference or earlier selections of interactivity schedules, a selection can be made for the user which can then be confirmed by the user. In the second step 102, the web service receives a selection of an interactivity schedule from the set of interactivity schedules from the user. The selected interactivity schedule relates to, at least, a first device and a second device. More complex interaction schedules relating to more than two devices can also be presented and selected. The first device and the second device are accessible through a second network. This second network can, for example, be a Private Area Network, a Local Area Network, a Wide Area Network or another network. The second network can be a network of networks, where for example the first device is on a first Private Area Network and the second device is on a second Private Area Network, and the first and second Private Area Network are interconnected as both are connected to the same Local Area Network.

In the third step 104, a control device is selected. This selection step can be executed by the same application that provides the web service or by another application. As an example, the web service can be provided by a first server connected to the internet and the selection of the control device can be executed by an application running on a second server, the application being called by the web service (e.g. through an Application Programming Interface). The control device can be selected, for example, based on there being a default control device (e.g. the server running the web service) and after determining if any condition (e.g. the server lacking capacity, instability of the connection between the server and the first and/or second device) is met that prevents the default control device from being selected as the control device. In another example, the control device is selected by the user through the web service. Several control devices can be presented to the user who then selects one control device. In yet another example, the user selects one or more requirements and/or preferences related to the selection of a control device. The step of selecting a control device can then be based on these requirements and/or preferences. Requirements related to the selection of a control device can comprise requirements related to the control device having a privacy seal, the control device being at a specific location (e.g. within a specific jurisdiction, in a zone, in a home, in a room), the control device being operated by a specific company, etc. Preferences related to the selection of a control device can comprise favoring the selection of a fast control device (e.g. based on the specifications of the control device, measured response speed of the control device, bandwidth of the connection to the control device), preferring a control device that offers a specific functionality (e.g. interaction with devices of multiple brands, interaction with devices of friends that are registered to a specific service), etc. Combinations of these requirements and/or preferences and many other selection criteria can be part of an implementation of the step of selecting a control device.

The step of configuring the devices 106 comprises sending configuration related data to at least one of the devices. It is not required that all devices are configured when a user selects an interaction schedule. As an example, a device can already have been configured based on an earlier interaction schedule selected by the user and require no change when another interaction schedule is selected. Also, the control device can be the first device, in which case the interaction schedule is implemented by configuring the first device and the second device. As an example, the user selecting an interaction schedule related to a lighting device (the first device) being dimmed, resulting in the display of a refrigerator (the second device) going to a power save mode, can result in the lighting device being configured to send a power-save-mode command to the fridge upon the lighting device being dimmed.

Configuration-related data can, as a first example, comprise a script implementing listeners, event casters, polling and statements such as if-then statements. A first device can be configured to send an event to the second device when a condition is fulfilled, for example when a user turns on the first device. The second device can be configured to listen for this event and, for example, change its mode (e.g. from off to on) when the event is received (e.g. "if event is received then change mode to on"). Event casting can be directed to specific devices (e.g. unicast) or multiple devices, such as all devices on a (sub)net of the network (e.g. multicast). Similarly, listeners can be selective about which device or which events are listened to. In this example, instead of the first device sending events and the second device listening for events, the second device can be configured to poll the first device (e.g. poll status of first device) and change its mode based on the results of polling.

As a second example, configuration-related data can comprise a control code loaded to the memory of a device. Such a control code can, for instance, comprise a firmware update for the first device, wherein the new firmware is based on the selected interaction schedule. The firmware can, for instance, be created by the web service or an application called by the web service based on the interaction schedule and a device profile of the first device. As a further example, the web service can retrieve from a server (e.g. hosted by the manufacturer of the first device) a firmware package including a default version of the firmware and data describing at what locations in the firmware values can be overwritten, amended, included or appended. Said values can include triggers (i.e. which event triggers an action), addresses (e.g. of a device that must be notified upon a trigger) or commands (e.g. a specific format of a data packet payload to be sent to a device that must be notified or controlled). The configuration-related data, such as a script, firmware or configuration package can be sent to a device, for example, by the web service or by an application that is called by the web service. Sending configuration-related data to a device can, for example, comprise sending one or more files containing said data or sending a reference to said data (e.g. a link to a location where said data can be retrieved). Furthermore, the firmware update can comprise any of: overwriting existing control code, amending existing control code, appending control code to the existing control code, storing new control code to coexist with existing control code, switching from old control code to new control code, etc.

Figure 2:
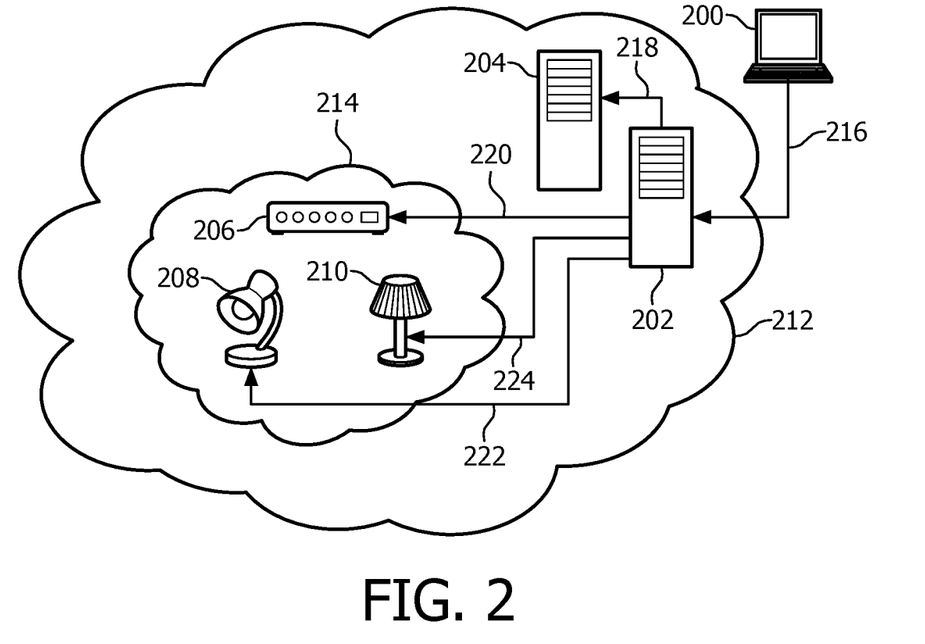
FIG. 2 shows schematically and exemplarily relations between a first device, a second device, two control devices and other devices in an embodiment of the method according to the invention.

In FIG. 2, relations between a first device 208, a second device 210, a first control device 204 and a second control device 206 are shown as per an embodiment of the method according to the invention. Through a mobile device 200, a web service 202 is accessed by a user (not shown), wherein the web service can access a first control device 204, a second control device 206, a first device 208 and a second device 210. The web service 202 and the first control device 204 are accessible through a first network 212. The first device 208, the second device 210 and the second control device 206 are accessible through a second network 214. The second network 214 is a subnet of the first network 212, for example, the first network 212 can be a Wide Area Network of an internet service provider and the second network 214 can be a Local Area Network connected to the network of the internet service provider.

The first relationship 216 involves the mobile device 200 and the web service 202: the mobile device 200 can be used by the user to select an interactivity schedule (not shown). The other relationships 218, 220, 222, 224 are between the web service 202 and the first control device 204, the second control device 206, the first device 208 and the second device 210, respectively, wherein the web service 202 configures said devices (e.g. directly or by calling an Application Programming Interface of another web service).

Figure 3:
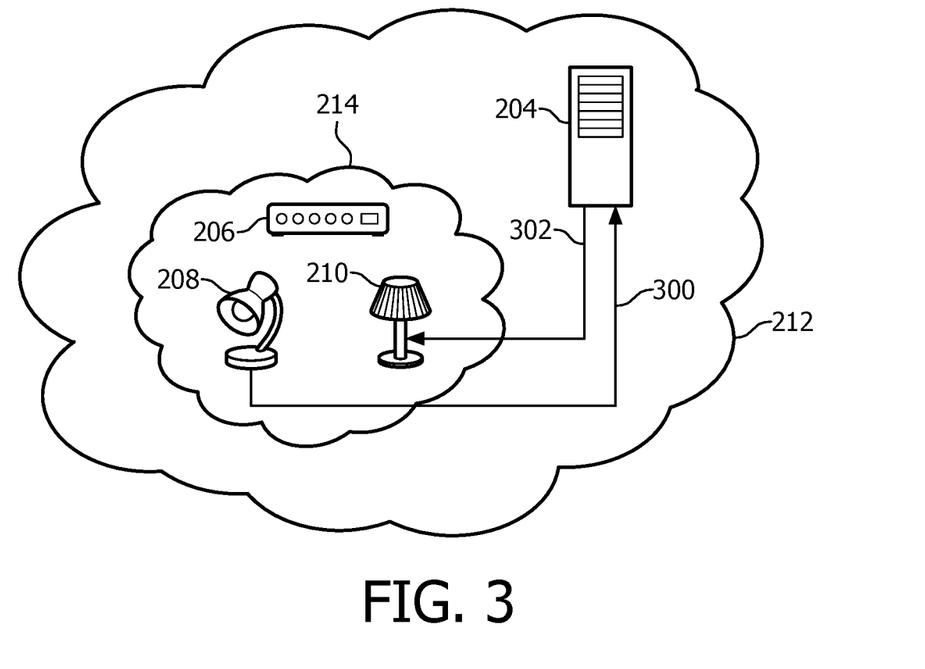
FIG. 3 shows schematically and exemplarily an interaction between multiple devices, based on the configuration of the devices, via an embodiment of the method according to the invention.

FIG. 3 shows an interaction between a first device 208 and a second device 210 through the first control device 204, based on the configuration of the devices according to an embodiment of the method of the invention. The step of selecting the control device has resulted, in this example, in the selection of the first control device 204. The second control device 206 is not involved in the interaction between the first device 208 and the second device 210. The first device 208 and the second device 210 are, in this example, lighting devices. The interaction schedule selected (not shown) relates to the first device 208 being switched ON by a user, resulting in the second device 210 switching ON as well. The configuration of the devices has resulted in the first device 208 being configured to send an event 300 when it is turned ON to the first control device 204. The first control device 204 has been configured to send, upon receiving an event 300 from the first device 208, a command 302 to the second device 210. The command 302 is arranged to switch ON the second device 210. In this example, all of the first device 208, the second device 210 and the first control device 204 can communicate over an Internet Protocol-based network, wherein the second network 214 is a subnet of the first network 212. The first device 208 and the second device 210 can communicate directly through the first network 212 and the second network 214 with the first control device 204 and vice versa.

Figure 4:
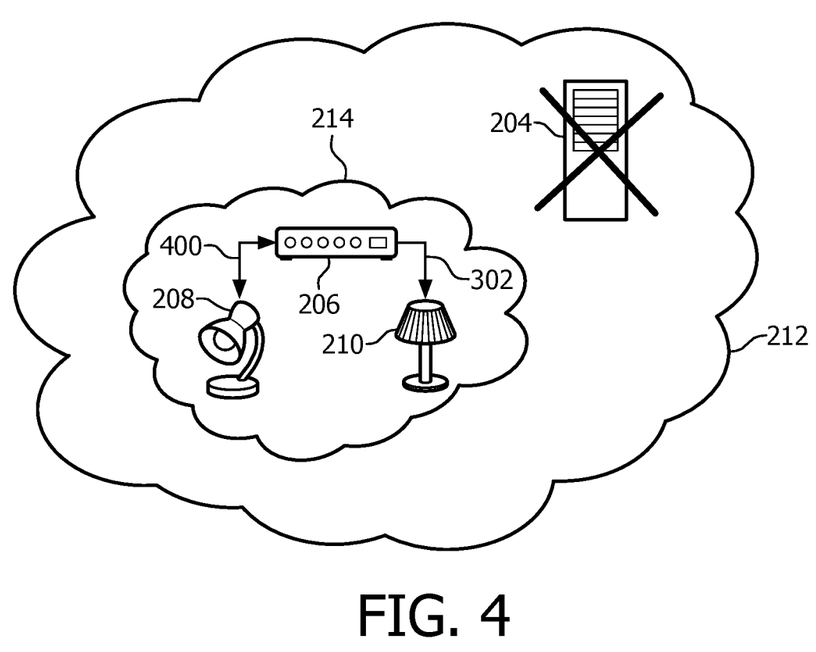
FIG. 4 shows schematically and exemplarily an interaction between a first device and a second device through the second control device, based on the configuration of the devices as per an embodiment of the method according to the invention.

FIG. 4 shows an interaction between a first device 208 and a second device 210 through the second control device, based on the configuration of the devices as per an embodiment of the method according to the invention. The step of selecting the control device has resulted, in this example, in the selection of the second control device 206. The first control device 204 is not involved in the interaction between the first device 208 and the second device 210. Furthermore, the first control device 204 is not available, in this example, which is indicated by it being crossed out in FIG. 4. The first device 208 and the second device 210 are, in this example, lighting devices. The interaction schedule selected (not shown) relates to the first device 208 being switched ON by a user, resulting in the second device 210 switching ON as well. The configuration of the devices has resulted in the first device 208 being polled by the second control device 206, wherein the polling 400 comprises a request and a response. The request is sent by the second control device 206 to the first device 208 and the response is sent by the first device 208 to the second control device 206. In this example, the request can be related to requesting the status of the first device 208, which can be either ON or OFF. The second control device 206 has been configured such that, upon polling 400 the first device 208 and receiving a response that the status is ON, it sends a command 302 to the second device 210. The command 302 is arranged to switch ON the second device 210. In this example, all of the first device 208, the second device 210 and the second control device 206 can communicate over an Internet Protocol-based network, wherein the second network 214 is a subnet of the first network 212. The first device 208 and the second device 210 can communicate directly through the first network 212 with the second control device 206 and vice versa. The first control device 204 not being available in this example, can be related to various factors, such as a power failure of the first control device 204, the connection of the first control device 204 to the first network 212 failing, etc. The benefit of the second control device 206 having been selected as the control device is that the interaction between the first device 208 and the second device 210 remains, which would not be the case if the first control device 204 had been selected as the control device. The selection of the control device can comprise selecting an additional control device (not shown), such as an auxiliary control device, a backup control device, a second control device, etc. In case of failure of the selected control device, the additionally selected control device can then control the first device and the second device, based on the selected interaction.

Figure 5A:
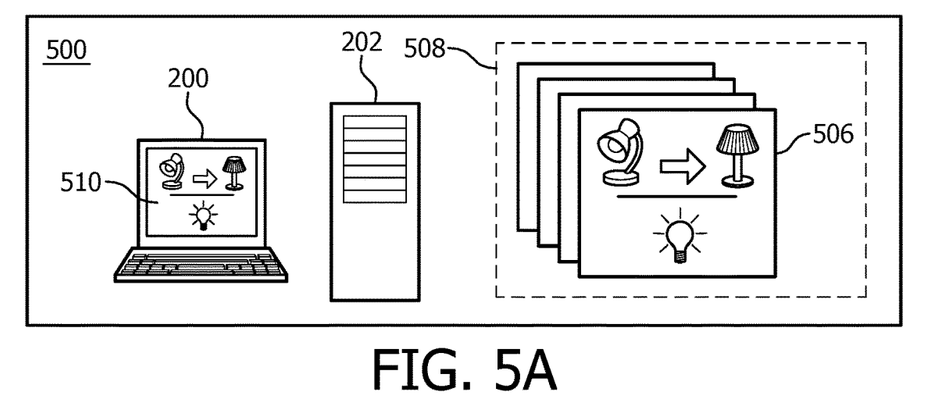
FIG. 5 shows schematically and exemplarily an embodiment of the method according to the invention, wherein a user selects an interaction schedule related to a first lighting device and a second lighting device.
Figure 5B:
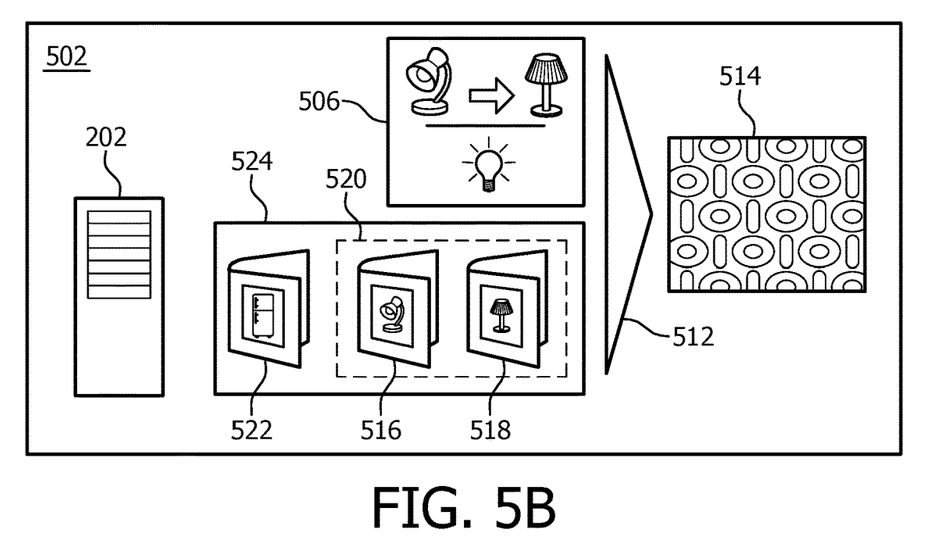
Figure 5C:
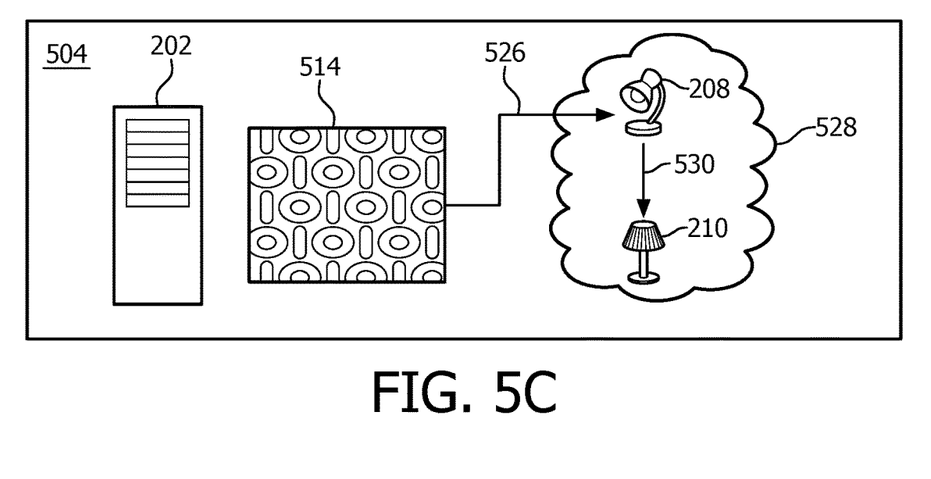

FIG. 5A, FIG. 5B and FIG. 5C show an embodiment of the method according to the invention, wherein a user has selected an interaction schedule related to two lighting devices. Three steps are shown; referring to FIGS. 5A, 5B and 5C, respectively, the first step 500 shows the user selection of an interaction schedule, the second step 502 shows the selection of a control device and the third step 504 shows the configuration of the devices. In the first step 500, a user (not shown) selects an interaction schedule 506 from a set of interaction schedules 508. The user does this by accessing a web service 202 through a mobile device 200 arranged to display a user interface 510. The interaction schedule 506 selected in this example relates to a first device 208 and a second device 210, wherein the first device 208 being switched ON by a user results in the second device 210 switching ON as well (as graphically represented in the selected interaction schedule 506 in the first step 500 in FIG. 5A).

Now, referring to FIG. 5B, the second step 502 shows the web service 202 creating 512 a configuration package 514 based on the selected interaction schedule 506 and on a device profile 516 of the first device 208 and a device profile 518 of the second device 210. The web service 202 accesses a set of device profiles 524 which, in this example, comprises a device profile 516 of the first device 208, a device profile 518 of the second device 210 and a device profile 522 of another device. In this example, the first device 208 is also a control device and the web service 202 selects the first device 208 as the control device. From the set of device profiles 524, the web service determines a subset of device profiles 520 relevant to the selected interaction schedule 506. Based on the subset of device profiles, the web service 202 creates 512 a configuration package 514.

Now, referring to FIG. 5C, the third step 504 shows the configuration package 514 being sent 526 to the first device 208. The first device 208 and the second device 210 are accessible to the web service 202 through a home network 528. As the first device 208 is also the control device and, in this example, the first device 208 is configured through the configuration package 514 to control the second device 210, no other devices need to be configured. The result of the configuration is that the first device 208 is configured to send a command 530 to the second device 210 when the first device is switched ON. The command 530 is arranged to switch ON the second device 210.

The selection of the control device can, for example, also be performed by the user (not shown). The web service presents a set of control scenarios to the user and receives a selection of a control scenario from the user. The selected control scenario can provide, for example, user-specified requirements related to security standards a control device must support. As another example, the control scenario can specify that only control devices in a specific network (e.g. the network to which the first device and the second device are coupled) can be used. Furthermore, the control device selection can be implemented to allow the user to select a control scenario from a set containing at least one of: a privacy-based control scenario, a security-based control scenario, a functionality-based control scenario, an availability-based control scenario, a response speed-based control scenario or a location-based control scenario (not shown). This can simplify the process for the user and provide the user with intuitive choices leading to the control device selection. As an example, a functionality control scenario can lead to the selection of a control device that supports a wide array of functions, an availability control scenario can lead to the selection of a control device that has an uptime greater than 99%, a response speed scenario can lead to the selection of a control device supporting a fast protocol (e.g. a protocol with low overhead) that is supported natively by the first and second device and a location control scenario can lead to the selection of a device that is in the same (physical) location as the user. If the user can select multiple scenarios or rank scenarios, as an example, the selection of the control device can be based on multiple requirements and/or requests.

Figure 6:
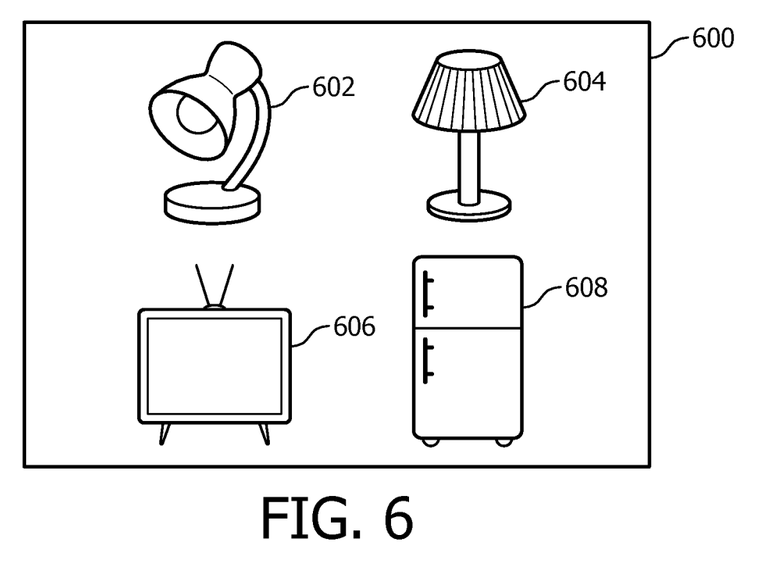
FIG. 6 shows schematically and exemplarily a user interface for selecting a first device and a second device.
Figure 7:
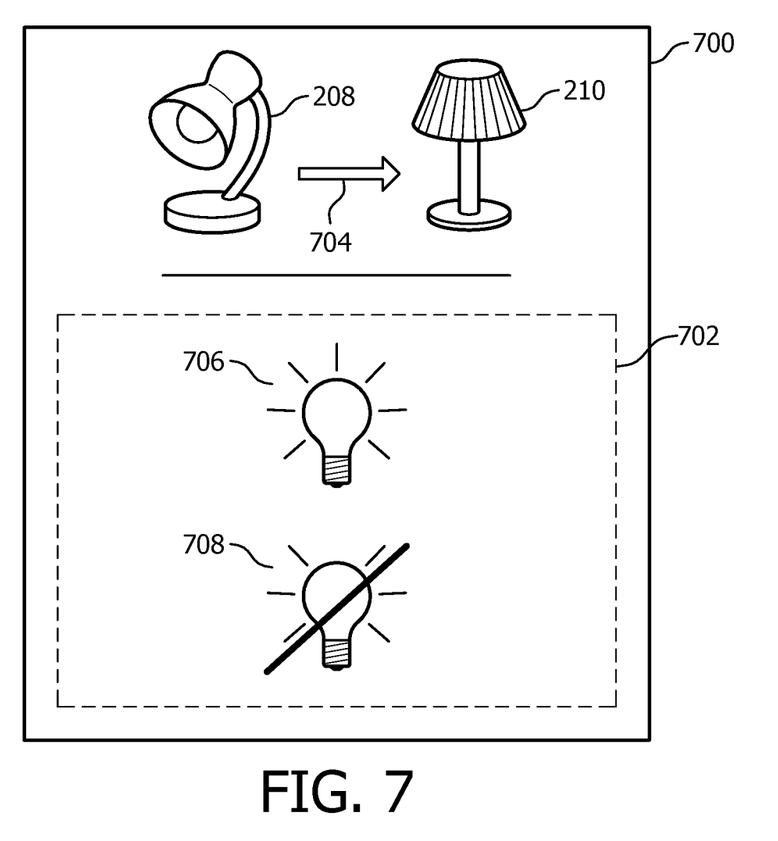
FIG. 7 shows schematically and exemplarily a user interface for selecting an interaction schedule related to a first device and a second device.

FIG. 6 shows a user interface for selecting a first device and a second device. To guide a user through the process of selecting an interaction schedule related to a first device and a second device, a user interface can present multiple approaches. In this example, a display 600 presents a desk lamp 602, a table lamp 604, a television 606 and a refrigerator 608. A user can select a first device and a second device, and interaction schedules which relate to this first device and second device and which are to be presented in a next step (not shown), FIG. 7 shows a user interface for selecting an interaction schedule. The interaction schedule is related to a first device 208 and a second device 210. In this example, a display 700 presents a selection of interactions 702 related to the first device 208 controlling 704 the second device 210. The interactions the user (not shown) can choose from, in this example, are represented by a pictogram of a lamp switched ON 706 and a pictogram of lamp switched OFF 708. The user can then select (not shown) the pictogram of the lamp switched ON 706 to select an interaction schedule wherein switching ON the first device 208 results in the second device 210 being switched ON as well.

Figure 8:
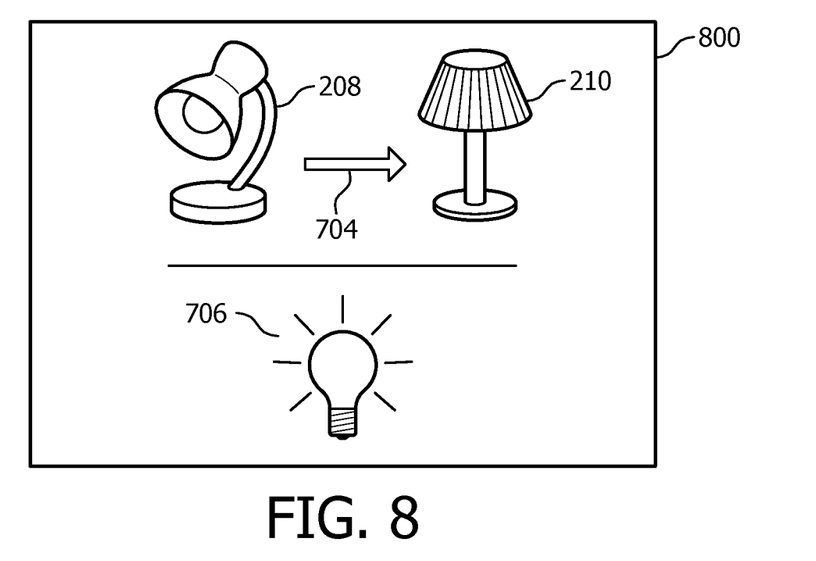
FIG. 8 shows schematically and exemplarily a user interface presenting the selected interaction schedule between a first device and a second device.

FIG. 8 shows a user interface presenting the selected interaction schedule between a first device and a second device. In this example, a display 800 presents an interaction schedule wherein a user switching ON the first device 208 results in said device controlling 704 the second device 210 to switch ON as well. The pictogram of a lamp switched ON 706 shows the user (not shown) that the interaction relates to switching ON, instead of for example switching OFF, the devices.

Figure 9:
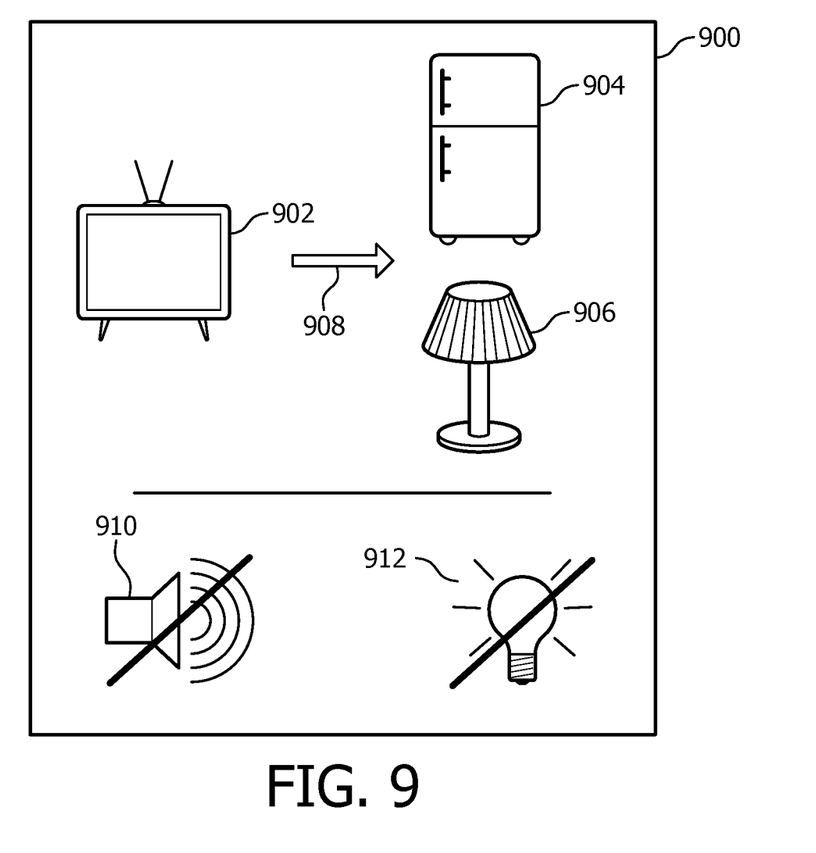
FIG. 9 shows schematically and exemplarily a user interface presenting a suggestion for an interaction schedule involving multiple devices.

FIG. 9 shows a user interface presenting a suggestion for an interaction schedule. The interaction schedule involves multiple devices. In this example, a display 900 presents an interaction schedule relating to a television 902, a refrigerator 904 and a table lamp 906. The interaction that is shown is that if television 902 is ON, this should result 908 in the refrigerator 904 going to silent mode, as shown by means of the silent mode pictogram 910, and the table lamp 906 being switched OFF, as shown by means of the lamp OFF pictogram 912.

Figure 10:
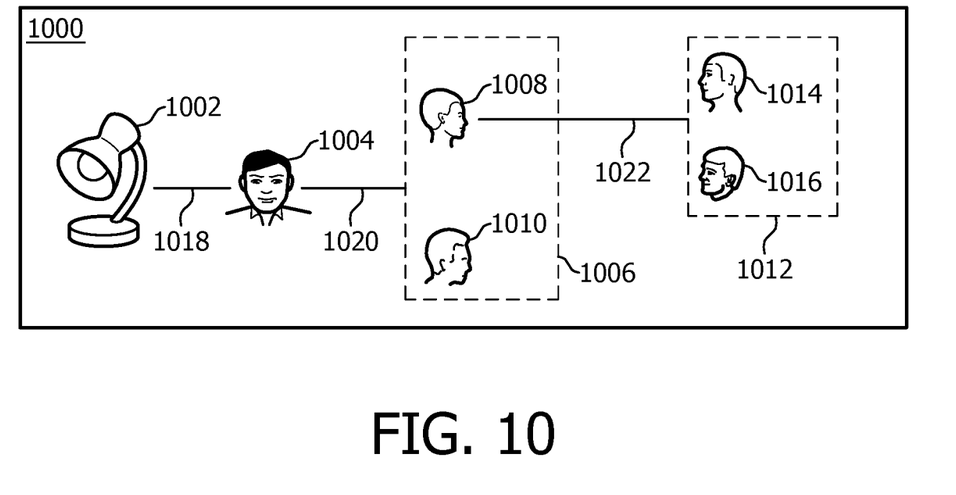
FIG. 10 shows schematically and exemplarily a user interface presenting a relation between a device, the device's owner, the device's owner's friends and friends of a device's owner's friend.

FIG. 10 shows a user interface presenting a relation between a device and people. In this example, a display 1000 presents the relationships between a device 1002 and the device's owner 1004, between the device's owner 1004 and the device's owner's friends 1006 and between a friend 1008 of the device's owner and friends of said friend. The relationships presented are ownership 1018 and friends 1020, 1022. In this example, the user interface can be arranged so that the user (not shown) can select who can select an interaction schedule and configure the device 1002 accordingly. The user, for example the device's owner 1004, can select that an ownership 1018 relationship is required to select an interaction schedule and configure the device 1002. In another example, the user can select a specific friend 1010 who can select an interaction schedule and configure the device 1002. A similar user interface can be used (not shown) allowing a user to select which devices should be presented to the user in the process of selecting an interaction schedule (e.g. only the user's own devices or also those of other people that the user can select an interaction schedule for; those other people, for example, having made a selection allowing the user to control their devices).

Figure 11:
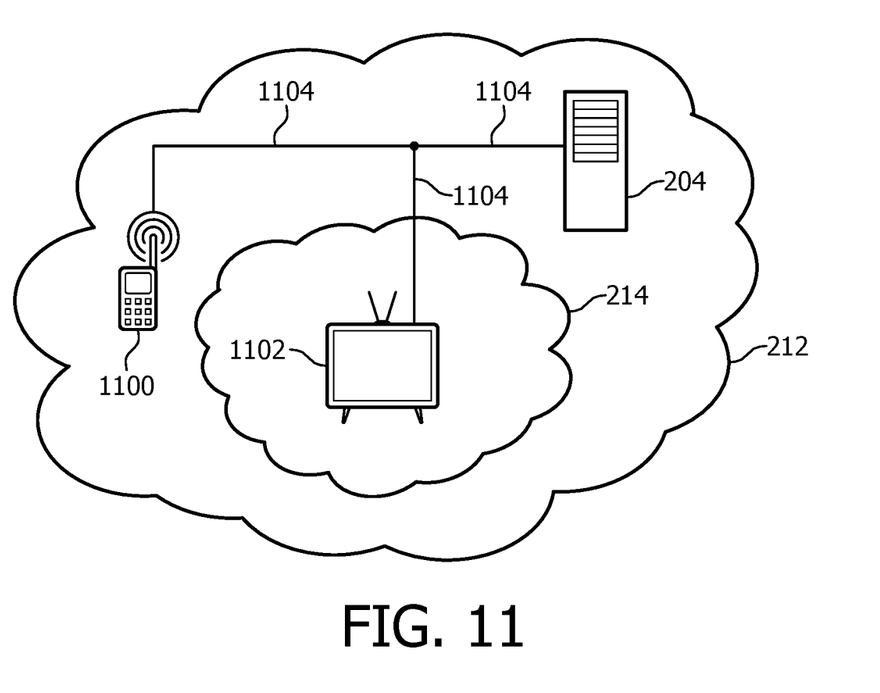
FIG. 11 shows schematically and exemplarily a relationship between a first device in a first network and a second device in a second network.

FIG. 11 shows a three-party relationship 1104 between a mobile phone 1100, a television 1102 and the first control device 204. If the user has selected as the first device the mobile phone 1100 and as the second device the television 1102, the mobile phone 1100 can be configured to control the television 1102 through the first control device 204. An interaction schedule can comprise, for example, that pushing a button on the mobile phone 1100 changes the channel to which the television 1102 is tuned. In this example, the mobile phone 1100 and the first control device 204 are accessible through a first network 212 and the television 1102 is accessible through a second network 214. As the second network 214 is a subnet of the first network 212 (e.g. the first network is an Internet Service Provider's Wide Area Network and the second network is a Local Area Network that is part of said Wide Area Network), the first device and the second device are accessible through either the first network 212 or the second network 214.

Figure 12:
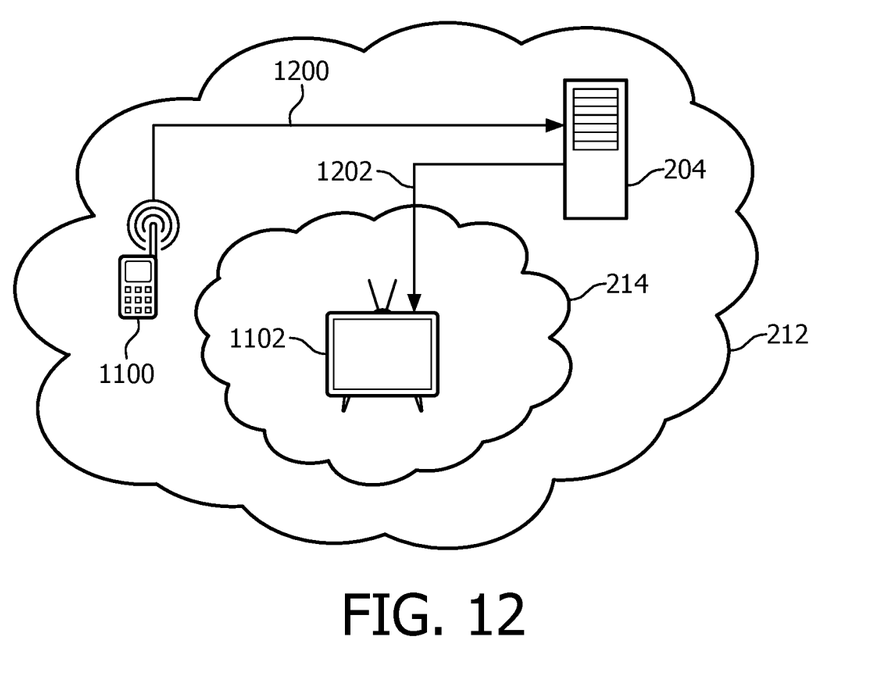
FIG. 12 shows schematically and exemplarily an interaction between a first device and a second device through the first control device, based on the configuration of the devices as per an embodiment of the method according to the invention.

FIG. 12 shows an interaction between a first device and a second device through the first control device, based on the configuration of the devices as per an embodiment of the method according to the invention. In this example, the first device is a mobile phone 1100 configured to interact with a second device, a television 1102. The mobile phone 1100 is configured to send a first command 1200 to the first control device 204 and the first control device is configured so that, after receiving this command, it sends a second command 1202 to the television 1102. The first command 1200 can reach the first control device 204 through the first network 212. The second command 1202 can reach the television 1102 through the first network 212 and the second network 214.

Figure 13:
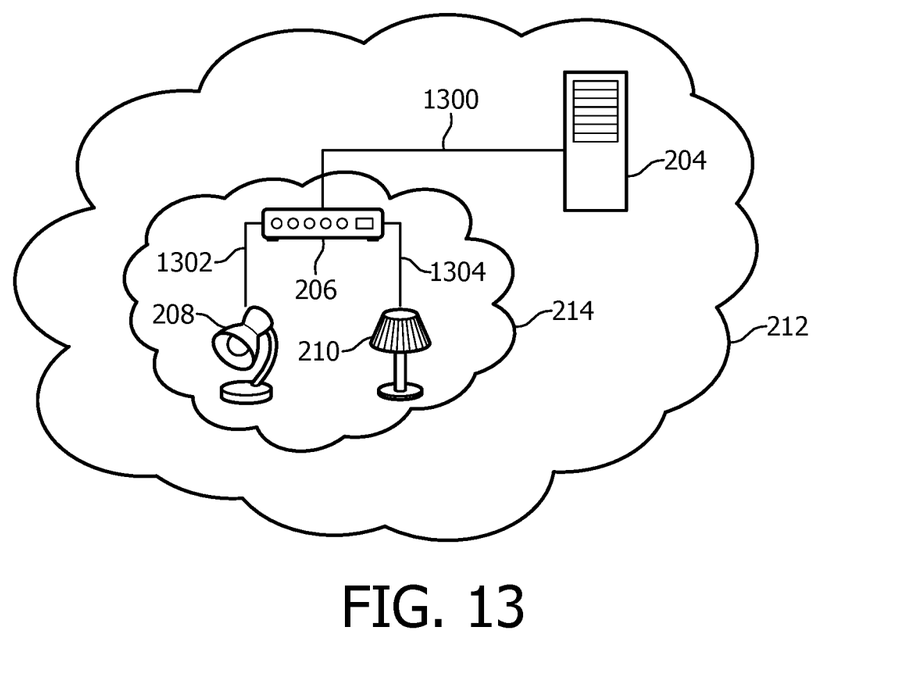
FIG. 13 shows schematically and exemplarily connections between the second control device, arranged as a gateway for the subnet, and the first control device.

FIG. 13 shows connections between the first control device 204 and the second control device 206 as per an embodiment of the method according to the invention. The second control device 206 is arranged as a gateway to the second network 214, as such communications between the first network 212 and the second network 214 pass the second control device 206. In this embodiment, the first control device 204 has been selected as control device. As the second control device 206 is a gateway to the second network 214 and the first device 208 and second device 210 are located in the second network 214, control data for the first device 208 and the second device 210 can be sent through a first connection 1300 between the first control device 204 and the second control device 206. The second control device 206 arranged as gateway has a second connection 1302 to the first device 208 and a third connection 1304 to the second device 210. These connections can be made over one or more networks, such as wired networks (e.g. UTP based network), wireless networks (e.g. WiFi or Zigbee based networks), etc.

If the selection of the control device comprises selecting an additional control device (not shown), such as an auxiliary control device, a backup control device, a second control device, etc. then, in case of failure of the selected control device, the additionally selected control device can control the first device and the second device based on the selected interaction. The second control device as gateway can detect failure of the first control device, for example, by monitoring communications between the first device or the second device and the first control device, by monitoring the status of the first control device, etc. If the first control device is the selected control device, the second control device can control the interaction between the first device and the second device in case of detection of a failure of the first control device.

Figure 14:
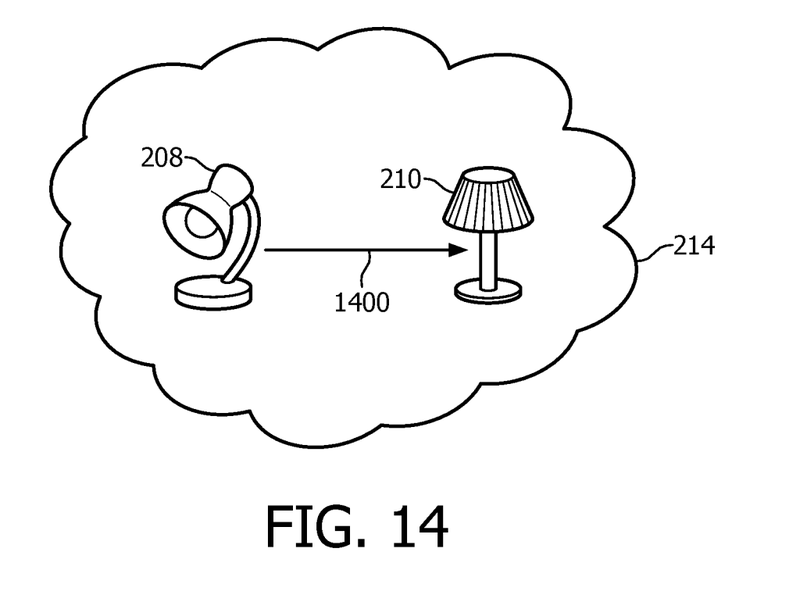
FIG. 14 shows schematically and exemplarily an interaction between a first device and a second device, wherein the first device is the second control device, based on the configuration of the devices as per an embodiment of the method according to the invention. In the different figures, the same reference signs refer to the same or analogous elements.

FIG. 14 shows an interaction between a first device 208 and a second device 210 based on the configuration of the devices as per an embodiment of the method according to the invention. The first device 208 is also the second control device and in this embodiment the selected control device. As an example, the selected interaction can comprise that a change in color setting of the first device 208, such as a change in the color temperature of the light emitted by a light source, should result in a similar change in the color setting of the second device 210. In this example, the first device 208 has been configured to send a command 1400 to the second device 210 over the second network 214 when a change in the color setting is made. The command 1400 changes the color setting of the second device 210 to reflect the change made in the color setting of the first device 208.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware or software. The usage of the words first, second and third, etcetera does not indicate any ordering. These words are to be interpreted as names. No specific sequence of acts is intended to be required unless specifically indicated.

The invention claimed is:

1. A method of controlling network-enabled devices comprising the steps of:
   presenting, through a web service accessible through a first network, to a user a set of interaction schedules based on device profiles related to a user profile of the user;
   receiving from the user, through the web service, a selection of an interaction schedule from the set of interaction schedules, said selection of an interaction schedule relating to a first device and a second device accessible through a second network operationally coupled to the first network;
   selecting, through the web service, a control device based on the selected interaction schedule and based on said device profiles related to said user profile of the user, wherein the selection of the control device is further based on requirements related to the control device having a privacy protection device/seal or the control device being at a specific location or operated by a specific party; and
   configuring the selected control device, the first device and the second device based on the selected interaction schedule, wherein configuration-related data comprises one or more of: a script implementing listeners, event casters, polling and if-then statements; and
   wherein the step of configuring the selected control device, the first device and the second device comprises at least one of said devices receiving:
   the selected interaction schedule or data based on the selected interaction schedule; and
   a device profile or a partial device profile of the control device and/or first and/or second device; and
   wherein the method further comprises the steps of:
   presenting to the user, through the web service, a set of control scenarios; wherein the selected control scenario specifies:
   user-specified requirements related to security standards a control device must support; and/or
   the control devices in a network in which the first device and the second device are coupled; and
   receiving from the user, through the web service, a selection of a control scenario from the set of control scenarios; and
   wherein the step of selecting a control device is further based on the selected control scenario;
   wherein the selection based on control scenario leads to one or more of:
   the selection of the control device that supports a wide array of functions;
   the selection of the control device that has an uptime greater than 99%;
   the selection of the control device supporting a fast protocol;
   the selection of the control device that is in the same physical location as the user.

2. The method of claim 1, wherein the control device is the first device.

3. The method of claim 1, wherein the set of control scenarios comprises at least one of: a privacy-based control scenario, a security-based control scenario, a functionality-based control scenario, an availability-based control scenario, a response speed-based control scenario or a location-based control scenario.

4. The method of claim 1, wherein the step of configuring the selected control device, the first device and the second device comprises at least one of:
- configuring the first device to send an event to the selected control device;
- configuring the selected control device to poll the first device; or
- configuring the selected control device to send a control command to the second device.

5. The method of claim 1, wherein the step of configuring the selected control device, the first device and the second device comprises, for at least one of said devices, changing control code stored in a memory unit of said device, from a first version to a second version, the second version being based on the selected interaction schedule.

6. A computer program product for controlling network-enabled devices comprising software code portions for performing the steps of claim 5, when said product is run on a computer.

7. The method of claim 1, wherein said interaction schedule is between the first device and the second device and comprises an event when a condition from the user to the first device is fulfilled and wherein the first device sends the event to the second device to trigger an action in the second device.

8. A control device for controlling network-enabled devices arranged for:
- receiving through a first network, an interaction schedule or data based on an interaction schedule selected by a user from a set of interaction schedules and relating to a first device and a second device, said devices relating to a user profile of the user and said devices being accessible through a second network
- receiving a device profile or a partial device profile of at least one of the first device and the second device;
- wherein the control device is selected to control the network-enabled devices based on the selected interaction schedule, said device profiles and on requirements related to the control device having a privacy protection device/seal or the control device being at a specific location or operated by a specific party;
- controlling the first device and/or the second device based on the selected interaction schedule;
- wherein said interaction schedule is between the first device and the second device and comprises an event when a condition from the user to the first device is fulfilled and wherein the first device sends the event to the second device to trigger an action in the second device; and
- wherein the control device is further arranged for receiving a control scenario or data related to a control scenario selected by the user from a set of control scenarios; wherein the selected control scenario specifies:
  - user-specified requirements related to security standards a control device must support; and/or
  - the control devices in a network in which the first device and the second device are coupled; and wherein controlling the first device and the second device is further based on the selected control scenario; wherein the selection based on control scenario leads to one or more of:
    - the selection of the control device that supports a wide array of functions;
    - the selection of the control device that has an uptime greater than 99%;
    - the selection of the control device supporting a fast protocol;
    - the selection of the control device that is in the same physical location as the user.

9. The control device of claim 8, wherein the control device is further arranged to act as a proxy for at least one of the first device and the second device towards the web service.

10. The control device of claim 8, wherein the control device is further arranged as a gateway to the second network.

11. The control device of claim 8, wherein the control device is further arranged as a gateway to the second network and wherein the control device is further arranged to:
- monitor data communications passing the gateway; and
- intercept, block and/or amend such data communications to or from the first device and/or the second device, based on the control scenario.

* * * * *